United States Patent
Fukushima

(10) Patent No.: US 11,384,505 B2
(45) Date of Patent: Jul. 12, 2022

(54) WORK VEHICLE

(71) Applicant: KOMATSU LTD., Tokyo (JP)

(72) Inventor: Takao Fukushima, Tokyo (JP)

(73) Assignee: KOMATSU LTD., Tokyo (JP)

( * ) Notice: Subject to any disclaimer, the term of this patent is extended or adjusted under 35 U.S.C. 154(b) by 111 days.

(21) Appl. No.: 17/053,408

(22) PCT Filed: Sep. 17, 2019

(86) PCT No.: PCT/JP2019/036390
§ 371 (c)(1),
(2) Date: Nov. 6, 2020

(87) PCT Pub. No.: WO2020/066750
PCT Pub. Date: Apr. 2, 2020

(65) Prior Publication Data
US 2021/0222396 A1    Jul. 22, 2021

(30) Foreign Application Priority Data

Sep. 28, 2018 (JP) .............................. JP2018-184700

(51) Int. Cl.
*F16H 61/06* (2006.01)
*F16H 61/14* (2006.01)
(Continued)

(52) U.S. Cl.
CPC ............ *E02F 3/841* (2013.01); *E02F 3/7636* (2013.01); *E02F 9/2079* (2013.01); *F16D 25/10* (2013.01);
(Continued)

(58) Field of Classification Search
CPC ................ F16H 61/0252; F16H 61/14; F16H 2061/145; F16H 2061/062; F16D 25/10; F16D 2300/06
See application file for complete search history.

(56) References Cited

U.S. PATENT DOCUMENTS 8,504,257 B2 * 8/2013 Yamaguchi ........... F16H 61/143
701/67
2002/0134637 A1   9/2002 Salecker et al.
(Continued)

FOREIGN PATENT DOCUMENTS

CN          1111005 A     11/1995
CN        101922553 A     12/2010
(Continued)

OTHER PUBLICATIONS

The Office Action for the corresponding Chinese application No. 201980034883.9, dated Jul. 5, 2021.
(Continued)

*Primary Examiner* — Tinh Dang
(74) *Attorney, Agent, or Firm* — Global IP Counselors, LLP

(57) ABSTRACT

A work vehicle includes an engine, a drive wheel, a power transmission mechanism configured to transmit a driving power of the engine to the drive wheel, and a control unit configured to control the power transmission mechanism. The power transmission mechanism has a torque converter including a first clutch, and a second clutch coupled to the torque converter. The control unit controls an oil pressure supplied to the first clutch to a predetermined oil pressure when the second clutch is partially engaged.

6 Claims, 5 Drawing Sheets

(51) Int. Cl.
*F16H 61/02* (2006.01)
*F16D 25/10* (2006.01)
*E02F 3/84* (2006.01)
*E02F 3/76* (2006.01)
*E02F 9/20* (2006.01)
*E02F 9/22* (2006.01)

(52) U.S. Cl.
CPC ......... *F16H 61/0262* (2013.01); *F16H 61/14* (2013.01); *E02F 9/2292* (2013.01); *E02F 9/2296* (2013.01); *F16D 2300/06* (2013.01); *F16H 2061/062* (2013.01); *F16H 2061/145* (2013.01)

(56) References Cited

U.S. PATENT DOCUMENTS

| | | |
|---|---|---|
| 2006/0016653 A1 | 1/2006 | Legner |
| 2010/0197459 A1* | 8/2010 | Yamaguchi ......... F16H 61/0246 477/176 |
| 2010/0312444 A1 | 12/2010 | Takamatsu et al. |
| 2011/0118083 A1 | 5/2011 | Nishimaki et al. |
| 2012/0108388 A1 | 5/2012 | Akebono et al. |
| 2014/0332333 A1 | 11/2014 | Yamawaki et al. |
| 2015/0019092 A1 | 1/2015 | Morimoto |
| 2019/0039577 A1 | 2/2019 | Nishimura et al. |

FOREIGN PATENT DOCUMENTS

| | | |
|---|---|---|
| CN | 102463981 A | 5/2012 |
| CN | 103998812 A | 8/2014 |
| CN | 104011437 A | 8/2014 |
| JP | 2000-337489 A | 12/2000 |
| JP | 2004-257518 A | 9/2004 |
| JP | 2006-506589 A | 2/2006 |
| JP | 2017-198294 A | 11/2017 |
| WO | 2009/041205 A1 | 4/2009 |
| WO | 2010/016354 A1 | 2/2010 |
| WO | 2017/170950 A1 | 10/2017 |

OTHER PUBLICATIONS

The International Search Report for the corresponding international application No. PCT/JP2019/036390, dated Nov. 19, 2019.

* cited by examiner

WORK VEHICLE

CROSS-REFERENCE TO RELATED APPLICATIONS

This application is a U.S. National stage application of International Application No. PCT/JP2019/036390, filed on Sep. 17, 2019. This U.S. National stage application claims priority under 35 U.S.C. § 119(a) to Japanese Patent Application No. 2018-184700, filed in Japan on Sep. 28, 2018, the entire contents of which are hereby incorporated herein by reference.

BACKGROUND

Field of the Invention

The present invention relates to a work vehicle.

Background Information

A work vehicle is known in the prior art that is provided with an inching function for reducing the vehicle speed while maintaining the engine rotation frequency at a predetermined rotation frequency by causing partial engagement of a clutch provided to the transmission to generate slippage (see Japanese Patent Laid-open No. 2000-337489). By using the inching function, the vehicle speed in a motor grader, for example, can be adjusted while limiting a reduction in the driving power of the blade when traveling while performing leveling work with the blade.

If the inching operating time increases in a work vehicle equipped with the inching function, the thermal load of the inching clutch increases. In particular, when the inching operation is finished and the inching clutch is switched from partial engagement to full engagement, the thermal load on the inching clutch can increase rapidly.

SUMMARY

Since there is a concern that excessive wear and damage of the inching clutch may occur when the thermal load of the inching clutch increases, there is a need to execute an inching clutch protection control. However, it is not easy to execute the inching clutch protection control without reducing the speed of the vehicle.

An object of the present invention is to provide a work vehicle that can both protect the clutch and limit speed reduction.

A work vehicle according to the present invention is provided with an engine, a drive wheel, a power transmission mechanism configured to transmit the driving power of the engine to the drive wheel, and a control unit configured to control the power transmission mechanism. The power transmission mechanism has a torque converter that includes a first clutch, and a second clutch coupled to the torque converter. The control unit controls the oil pressure supplied to the first clutch to a predetermined oil pressure when the second clutch is partially engaged.

According to the present invention, a work vehicle can be provided that can both protect the clutch and limit speed reduction.

DETAILED DESCRIPTION OF EMBODIMENT(S)

(Overall Configuration of Motor Grader 1)

Figure 1:
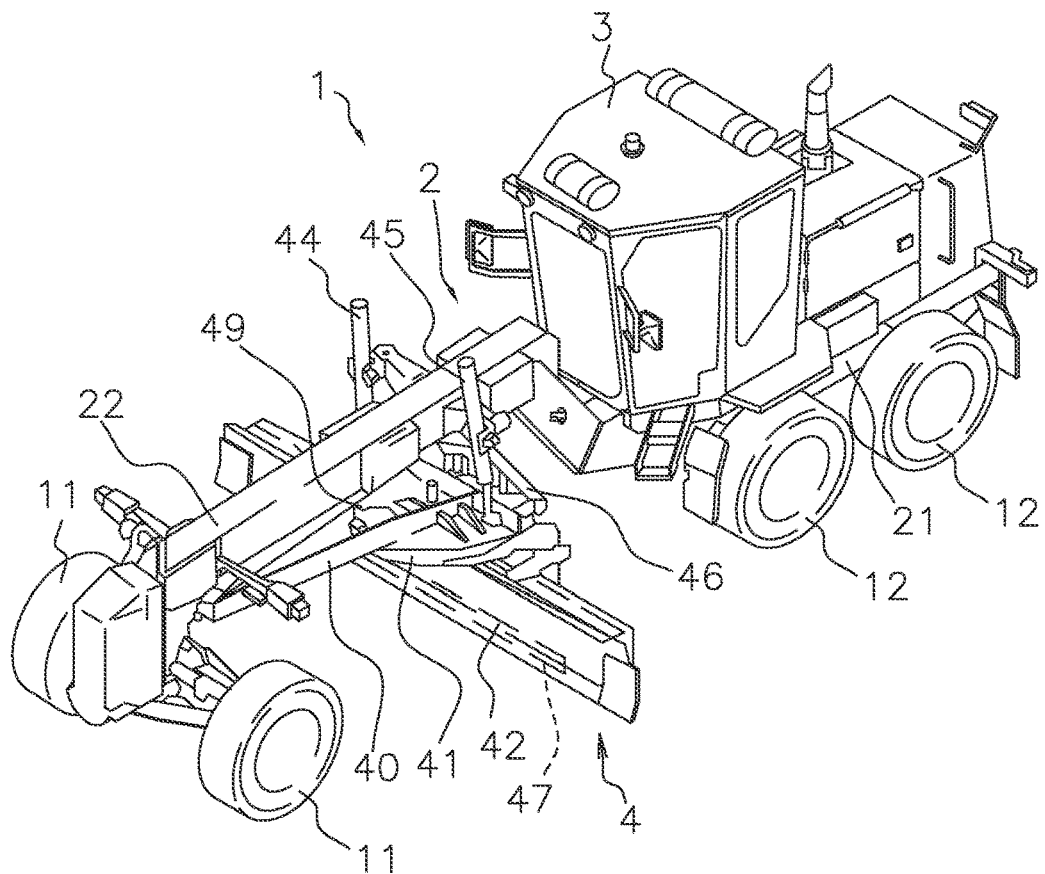
FIG. 1 is a perspective view of a motor grader.
Figure 2:
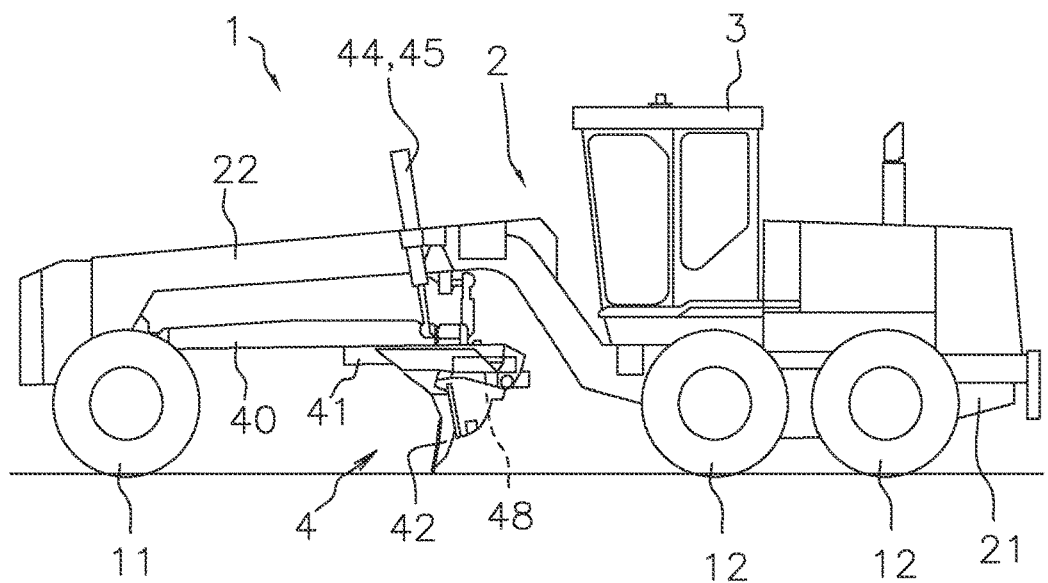
FIG. 2 is a side view of the motor grader.
Figure 3:
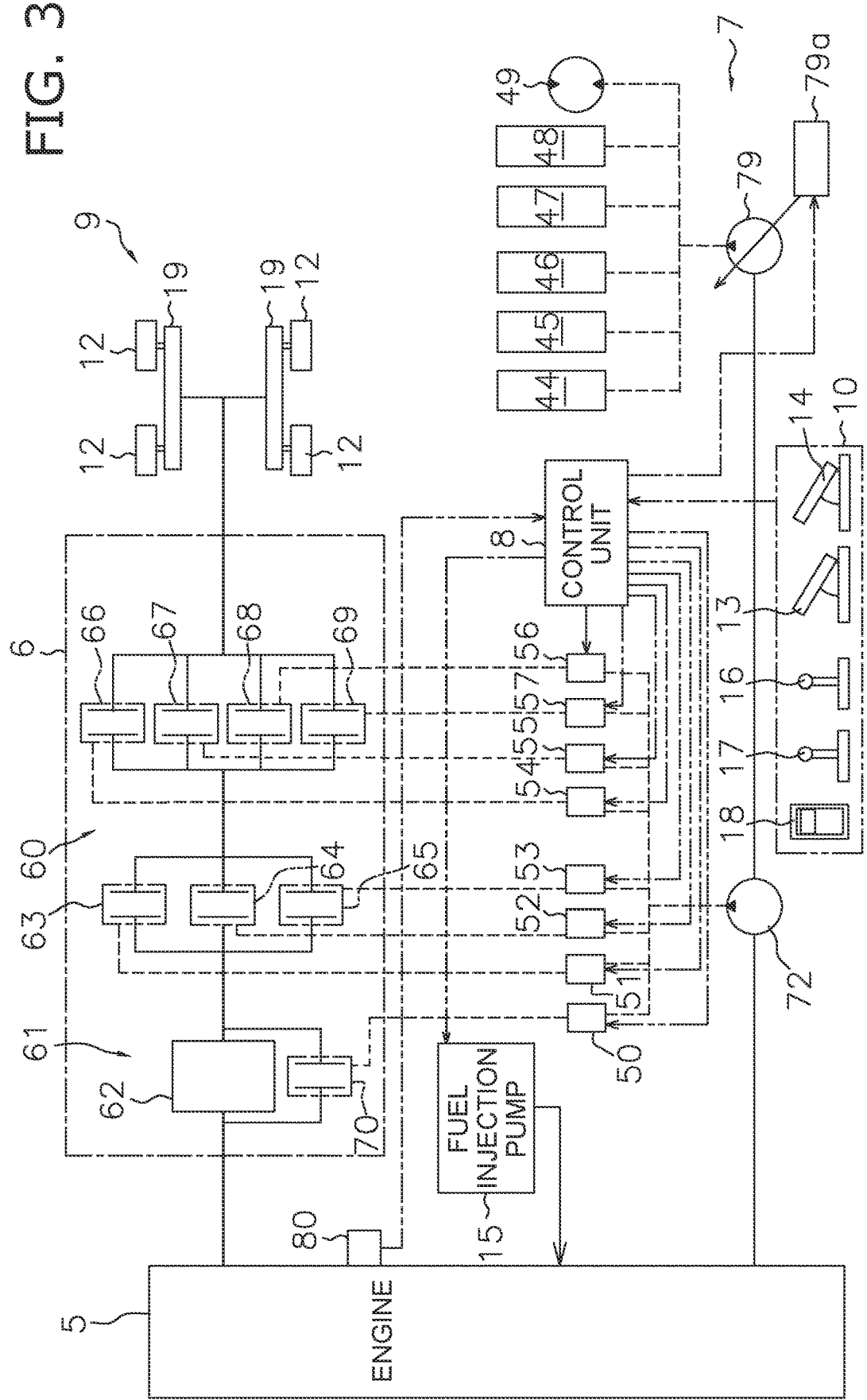
FIG. 3 is a block diagram illustrating a configuration of the motor grader.

FIG. 1 is a perspective view of a motor grader 1. FIG. 2 is a side view of the motor grader 1. FIG. 3 is a block diagram illustrating a configuration of the motor grader 1. In the following discussion, "up," "down," "left," and "right" are terms based on the traveling direction of the vehicle.

The motor grader 1 is provided with six traveling wheels made up of a pair of left and right front wheels 11 and two pairs of left and right rear wheels 12. The motor grader 1 is able to perform leveling work, snow removal, light cutting work, material mixing, and the like with a blade 42 provided between the front wheels 11 and the rear wheels 12. In FIGS. 1 and 2, only the rear wheels 12 positioned on the left side among the four rear wheels 12 are illustrated.

As illustrated in FIGS. 1 and 2, the motor grader 1 is provided with a frame 2, an operating cabin 3, and a work implement 4. As illustrated in FIG. 3, the motor grader 1 is provided with an engine 5, a power transmission mechanism 6, a travel mechanism 9, a hydraulic drive mechanism 7, an operating unit 10, and a control unit 8, etc.

(Frame 2 and Operating Cabin 3)

As illustrated in FIGS. 1 and 2, the frame 2 is configured by a rear frame 21 and a forward frame 22. The rear frame 21 contains the engine 5, the power transmission mechanism 6, and the hydraulic drive mechanism 7 and the like illustrated in FIG. 3. The two left and right pairs of rear wheels 12 are attached to the rear frame 21 and the rear wheels 12 are driven by rotation by driving power from the engine 5, whereby the vehicle is able to travel. In the present embodiment, each of the rear wheels 12 is example of a "drive wheel." The forward frame 22 is coupled to the front of the rear frame 21 and the left and right front wheels 11 are attached to a front end part of the forward frame 22.

The operating cabin 3 is mounted on the rear frame 21, and operating members such as a steering handle, a brake, an inching pedal 13, an accelerator pedal 14, a work implement lever 16, a speed change lever 17, and a mode switching switch 18 and the like are provided in the operating cabin 3. At least a portion of the operating cabin 3 may be mounted on the forward frame 22.

(Work Implement 4)

The work implement 4 is supported by the frame 2. The working implement 4 has a drawbar 40, a circle 41, the blade 42, a hydraulic motor 49, and various types of hydraulic cylinders 44 to 48.

A front end part of the drawbar 40 is attached in a swingable manner to the front end part of the forward frame 22. A rear end part of the drawbar 40 is raised and lowered vertically due to the synchronized extension and contraction of a pair of lift cylinders 44 and 45. The drawbar 40 swings vertically due to the different extension and contraction of the lift cylinders 44 and 45. The drawbar 40 swings to the left and right due to the extension and contraction of a drawbar shift cylinder 46.

The circle 41 is rotatably attached to a rear end part of the drawbar 40. The circle 41 is driven by the hydraulic motor 49 (see FIG. 1) and rotates in the clockwise direction or the anti-clockwise direction with respect to the drawbar 40 as seen from above the vehicle.

The blade 42 is supported in a manner that allows sliding in the left-right direction and allows swinging vertically with respect to the circle 41. The blade 42 can be moved in the left-right direction relative to the circle 41 due to a blade shift cylinder 47 supported on the circle 41. The blade 42 can swing about an axis parallel to the left-right direction with respect to the circle 41 in order to change the orientation of the blade 42 vertically by means of a tilt cylinder 48 (see FIG. 2) supported on the circle 41.

The hydraulic cylinders 44 to 48 are driven by oil pressure supplied from a below mentioned work implement pump 79. The hydraulic motor 49 rotates the circle 41 by means of being driven by pressure oil supplied from the work implement pump 79.

(Engine 5)

As illustrated in FIG. 3, a fuel injection pump 15 is provided to the engine 5 and fuel is supplied from the fuel injection pump 15 to the engine 5. The supply amount of fuel is controlled by command signals outputted by the below mentioned control unit 8. The rotation frequency of the engine 5 is detected by an engine rotation frequency sensor 80 and sent to the control unit 8 as a detection signal. The control unit 8 is able to control the rotation frequency of the engine 5 by controlling the supply amount of fuel to the engine 5.

(Power Transmission Mechanism 6)

The power transmission mechanism 6 transmits the driving power from the engine 5 to the rear wheels 12. The power transmission mechanism 6 has a transmission 60 and a torque converter 61.

The transmission 60 has clutches 63 to 69. The clutches 63 to 69 are each disposed on the output side of the torque converter 61. The clutches 63 to 69 are hydraulic clutches that are driven by oil pressure supplied from a below mentioned transmission pump 72. The clutches 63 to 69 include an FL clutch 63, an FH clutch 64, an R clutch 65, a first clutch 66, a second clutch 67, a third clutch 68, and a fourth clutch 69. The FL clutch 63, the FH clutch 64, and the R clutch 65 are coupled to the output side of the torque converter 61. The FL clutch 63, the FH clutch 64, and the R clutch 65 are examples of "directional clutches." The first clutch 66, the second clutch 67, the third clutch 68, and the fourth clutch 69 are examples of "speed clutches."

The FL clutch 63 and the FH clutch 64 are fully engaged when the vehicle is traveling forward. In the present embodiment, the clutch engaged among the FL clutch 63 and the FH clutch 64 is used for output adjustment according to an inching operation. In the following explanation, the clutch engaged at the start of the inching operation among the FL clutch 63 and the FH clutch 64 is referred to as an "inching clutch." The inching clutch is a clutch for adjusting the output from the transmission 60 by means of being partially engaged (that is, not fully engaged) in accordance with an operation of the below mentioned inching pedal 13. The inching clutch is an example of a "second clutch" according to the present invention. While the degrees of engagement in the full engagement and partial engagement of the inching clutch are not limited in particular, for example, an engagement degree of the inching clutch of 50% or more can be set as "full engagement," and an engagement degree of the inching clutch of less than 50% can be set as "partial engagement." The degree of engagement signifies a ratio of the oil pressure supplied to the clutch when the oil pressure is 100% when the engagement is completed.

The R clutch 65 enters the fully engaged state when the vehicle is traveling in reverse.

The first clutch 66, the second clutch 67, the third clutch 68, and the fourth clutch 69 enter the engaged states when the driving power is transmitted to the corresponding change gears. Velocity stages of speeds 1 to 8 may be selected with the transmission 60 according to combinations of either of the FL clutch 63 and the FH clutch 64 and any of the first clutch 66 to the fourth clutch 69 during forward travel. Moreover, velocity stages of speeds 1 to 4 may be selected according to combinations of the R clutch 65 and any of the first clutch 66 to the fourth clutch 69 during reverse travel.

The torque converter 61 is disposed between the engine 5 and the transmission 60. The torque converter 61 is coupled to the output side of the engine 5 and to the input side of the transmission 60. The torque converter 61 has a lock-up clutch 70 and a torque converter mechanism 62.

The lock-up clutch 70 is an example of a "first clutch" according to the present invention. The lock-up clutch 70 directly couples the input shaft and the output shaft of the torque converter 61. The lock-up clutch 70 is switched between an engaged state and a disengaged state. The switching of the engaged state and the disengaged state is executed by the below mentioned control unit 8. When the lock-up clutch 70 is switched to the engaged state and the lock-up clutch 70 is fully engaged, the input side and the output side of the torque converter 61 are directly coupled and the driving power of the engine 5 is transmitted without the intervention of the torque converter mechanism 62. When the lock-up clutch 70 is switched to the engaged state and the lock-up clutch 70 is partially engaged, the driving power of the engine 5 is transmitted through the lock-up clutch 70 and the torque converter mechanism 62. While the degrees of engagement in the full engagement and partial engagement of the lock-up clutch 70 are not limited in particular, for example, an engagement degree of the lock-up clutch 70 of 50% or more can be set as "full engagement," and an engagement degree of the lock-up clutch 70 of less than 50% can be set as "partial engagement." When the lock-up clutch 70 is switched to the disengaged state, the driving power of the engine 5 is transmitted through the torque converter mechanism 62 and the torque converter mechanism 62 fulfills a normal torque converter function.

While not illustrated in the drawings, the lock-up clutch 70 is cooled by immersion in a lubricating oil pooled inside the torque converter mechanism 62. Therefore, the cooling capability of the lock-up clutch 70 is set to be higher than the cooling capability of the abovementioned clutches 63 to 69 in the transmission 60.

(Travel Mechanism 9)

The travel mechanism 9 is a mechanism for enabling the vehicle to travel by using driving power from the engine 5. The driving power from the engine 5 is transmitted to the travel mechanism 9 through the power transmission mechanism 6. The travel mechanism 9 has the rear wheels 12 and a tandem device 19. Driving power outputted by the transmission 60 is transmitted to the rear wheels 12 through the tandem device 19 so that the rear wheels 12 are rotated whereby the motor grader 1 travels.

(Hydraulic Drive Mechanism 7)

The hydraulic drive mechanism 7 is a mechanism for generating oil pressure from the driving power from the engine 5 and for driving the clutches 63 to 70, the hydraulic motor 49, and the cylinders 44 to 48 with oil pressure. The hydraulic drive mechanism 7 has the work implement pump 79, the transmission pump 72, and hydraulic pressure control valves 50 to 57.

The work implement pump 79 is driven by driving power from the engine 5 to generate oil pressure to be supplied to the cylinders 44 to 48 and to the hydraulic motor 49. The work implement pump 79 is a variable capacitor hydraulic pump that can change the discharged oil amount in accordance with the tilt angle of a skew plate. The tilt angle of the skew plate of the work implement pump 79 is adjusted by a pump capacity control cylinder 79*a*.

The transmission pump 72 is driven by driving power from the engine 5 and generates oil pressure supplied to the various clutches 63 to 70.

The various hydraulic pressure control valves 50 to 57 are electromagnetic proportional control valves that are able to adjust the oil pressure by being electrically controlled by the control unit 8. The hydraulic pressure control valves 50 to 57 include a lock-up clutch control valve 50 and first to seventh clutch control valves 51 to 57.

The lock-up clutch control valve 50 adjusts the oil pressure supplied to the abovementioned lock-up clutch 70. The first to seventh clutch control valves 51 to 57 adjust the oil pressure supplied to the abovementioned clutches 63 to 69. Specifically, the first clutch control valve 51 adjusts the oil pressure supplied to the FL clutch 63. The second clutch control valve 52 adjusts the oil pressure supplied to the FH clutch 64. The third clutch control valve 53 adjusts the oil pressure supplied to the R clutch 65. The fourth clutch control valve 54 adjusts the oil pressure supplied to the first clutch 66. The fifth clutch control valve 55 adjusts the oil pressure supplied to the second clutch 67. The sixth clutch control valve 56 adjusts the oil pressure supplied to the third clutch 68. The seventh clutch control valve 57 adjusts the oil pressure supplied to the fourth clutch 69.

(Operating Unit 10)

The operating unit 10 is a member operated by the operator for respectively controlling the motor grader 1 and the work implement 4. The operating unit 10 has the inching pedal 13, an accelerator pedal 14, a work implement lever 16, a speed change lever 17, and a mode switching switch 18.

The accelerator pedal 14 is a member for setting the engine rotation frequency to a desired rotation frequency.

The inching pedal 13 is a member for reducing the vehicle speed by causing partial engagement of the inching clutch to generate slippage. When the inching pedal 13 is pressed, the oil pressure supplied to the inching clutch while in the fully engaged state is reduced and slippage is generated in the inching clutch. As a result, the driving power transmitted from the power transmission mechanism 6 to the travel mechanism 9 is reduced whereby the vehicle speed is reduced. Therefore, the operator is able to adjust the vehicle speed while suppressing a reduction in the rotation frequency of the engine 5 and maintaining output of the work implement 4 by operating the inching pedal 13 by pressing.

The work implement lever 16 is a member for driving the work implement 4. The operator performs desired work using the work implement 4 by operating the work implement lever 16.

The speed change lever 17 is a member for changing the speed of the transmission 60. The operator is able to change the combinations of the various clutches 63 to 69 by operating the speed change lever 17.

The mode switching switch 18 is a member for switching the speed mode of the power transmission mechanism 6 to either a manual mode or a torque converter mode. The manual mode and the torque converter mode are discussed below.

When the operating members of the operating unit 10 are operated, operation signals corresponding to the operations thereof are sent to the control unit 8.

(Control Unit 8)

The control unit 8 determines the supply amount of fuel to the engine 5 on the basis of the operation signals from the accelerator pedal 14 and the engine rotation frequency detected by the engine rotation frequency sensor 80. The control unit 8 then transmits a command signal in accordance with the determined supply amount to the fuel injection pump 15. As a result, the fuel injection amount from the fuel injection pump 15 is adjusted to an amount that conforms to the operation amount of the accelerator pedal 14 and the engine rotation frequency is controlled. As a result, the operator is able to control the output of the work implement 4 and the speed of the vehicle.

The control unit 8 drives the work implement 4 by controlling the pump capacity control cylinder 79*a* on the basis of the operation signals from the work implement lever 16.

The control unit 8 changes the speed of the transmission 60 by controlling the first to seventh clutch control valves 51 to 57 and the lock-up clutch 70 on the basis of the operation signals from the speed change lever 17.

The control unit 8 outputs command signals for lowering the oil pressure supplied to the inching clutch to the clutch control valve corresponding to the inching clutch among the first to third clutch control valves 51 to 53, on the basis of the operation signals from the inching pedal 13. The clutch control valve corresponding to the inching clutch lowers the oil pressure supplied to the inching clutch on the basis of the command signals. As a result, the surface pressure of the inching clutch while in the fully engaged state is lowered and slippage of the inching clutch is generated. Accordingly, the driving power transmitted from the power transmission mechanism 6 to the travel mechanism 9 is reduced whereby the vehicle speed is reduced. Therefore, the operator is able to adjust the vehicle speed while suppressing a reduction in the engine rotation frequency and maintaining the output of the work implement 4 by operating the inching pedal 13 by pressing.

The control unit 8 selectively switches the speed change mode of the power transmission mechanism 6 between the manual mode and the torque converter mode on the basis of the operation signals from the mode switching switch 18. The control unit 8 switches the lock-up clutch 70 to the engaged state in the manual mode. In this case, the operator is able to change the speed of the transmission 60 manually by operating the speed change lever 17. The control unit 8 switches the lock-up clutch 70 to the disengaged state and the driving power from the engine 5 is transmitted through the torque converter mechanism 62 in the torque converter mode. In this case, the operator is able to change the speed of the transmission 60 manually by operating the speed change lever 17 while the velocity is on the low speed side stage (for example, forward travel speeds 1-4). During this time, the control unit 8 maintains the lock-up clutch 70 in the disengaged state regardless of the vehicle speed or the engine rotation frequency. In addition, in the torque converter mode, the control unit 8 executes the speed change of the transmission 60 in response to the vehicle speed or the engine rotation frequency while the velocity stage is on the high speed side (for example, forward travel speeds 5-8). In this case, the control unit 8 switches the lock-up clutch 70 to the engaged state when the vehicle speed increases and the slippage of the torque converter mechanism 62 decreases.

The control unit 8 increases and reduces the oil pressure of the lock-up clutch 70 by transmitting command signals to the lock-up clutch control valve 50 in order to switch the lock-up clutch 70 between the engaged state and the disengaged state. The control unit 8 outputs command signals for setting the oil pressure of the lock-up clutch 70 to the maximum oil pressure (that is, 100), to the lock-up clutch control valve 50 when switching the lock-up clutch 70 from the disengaged state to the engaged state. The lock-up clutch control valve 50 increases the oil pressure of the lock-up clutch 70 to the maximum oil pressure on the basis of the command signals. As a result, the lock-up clutch 70 is switched from the disengaged state to the engaged state. The control unit 8 outputs command signals for setting the oil pressure of the lock-up clutch 70 to the minimum oil pressure (that is, 0), to the lock-up clutch control valve 50 when switching the lock-up clutch 70 from the engaged state to the disengaged state. The lock-up clutch control valve 50 reduces the oil pressure of the lock-up clutch 70 to the minimum oil pressure on the basis of the command signals. As a result, the lock-up clutch 70 is switched from the engaged state to the disengaged state.

The control unit 8 in the present embodiment controls the oil pressure supplied to the lock-up clutch 70 to a "predetermined pressure" when the lock-up clutch 70 is in the engaged state and the inching clutch is partially engaged on the basis of the operation signals from the inching pedal 13. Specifically, the control unit 8 outputs command signals for reducing the oil pressure of the lock-up clutch 70 from the maximum oil pressure to the predetermined oil pressure, to the lock-up clutch control valve 50. The lock-up clutch control valve 50 reduces the oil pressure of the lock-up clutch 70 to the predetermined oil pressure on the basis of the command signals. As a result, the lock-up clutch 70 is switched from being fully engaged to being partially engaged.

As a result, slippage of the lock-up clutch 70 is generated and the torque converter mechanism 62 begins to function when the inching operation is finished and the inching clutch is fully engaged again. As a result, an excessive rise in the clutch temperature when the inching clutch is fully engaged can be suppressed because the thermal load assumed only by the inching clutch is distributed to the torque converter 6 as well. Therefore, excessive wear of the inching clutch or damage to the inching clutch can be suppressed. In addition, because the lock-up clutch 70 is partially engaged, a reduction in the speed of the vehicle can be suppressed in comparison to a case when, for example, the lock-up clutch is switched to the disengaged state. As indicated above, the protection of the inching clutch and the suppression in speed reduction can both be achieved according to the method of the present embodiment.

The predetermined oil pressure is set to a value greater than zero and a value smaller than the maximum oil pressure on the basis of the torque capacity of the lock-up clutch 70. Specifically, the predetermined oil pressure is set so as to generate slippage in the lock-up clutch 70 when the inching clutch is fully engaged again and so as not to generate slippage in the lock-up clutch 70 when working with the work implement 4 while operating the inching pedal 13 by pressing. For example, the predetermined oil pressure can be set to an amount of a degree that allows the slippage of the lock-up clutch 70 when a load is applied that is larger than the anticipated maximum load when working with the work implement 4 while operating the inching pedal 13 by pressing. The torque capacity of the lock-up clutch 70 is preferably set for each velocity stage selected with combinations of the FL clutch 63 and any of the FH clutch 64 and the R clutch 65 and any of the first clutch 66 to fourth clutch 69.

The control unit 8 maintains the lock-up clutch 70 in the partially engaged state during the inching operation. Specifically, the control unit 8 reduces the oil pressure of the lock-up clutch 70 from the maximum pressure to the predetermined oil pressure as indicated above, and thereafter adjusts the command signals to be outputted to the lock-up clutch control valve 50 so that an oil pressure of which the measured value portion of an internal sensor for measuring the pressure inside the torque converter mechanism 62 is elevated with respect to the predetermined oil pressure, is supplied to the lock-up clutch 70. As a result, the lock-up clutch 70 is maintained in a semi-engaged state.

After the inching operation is finished and the inching clutch enters the fully engaged state again, the control unit 8 returns the oil pressure of the lock-up clutch 70 to the maximum oil pressure when a predetermined time period has elapsed. The predetermined time period can be set to a length in which the completion of the inching operation can be determined. In this way, hunting of the oil pressure due to a continuous inching operation can be suppressed by delaying the timing for returning the oil pressure of the lock-up clutch 70 to the maximum oil pressure.

(Inching Clutch Protection Control)

Figure 4:
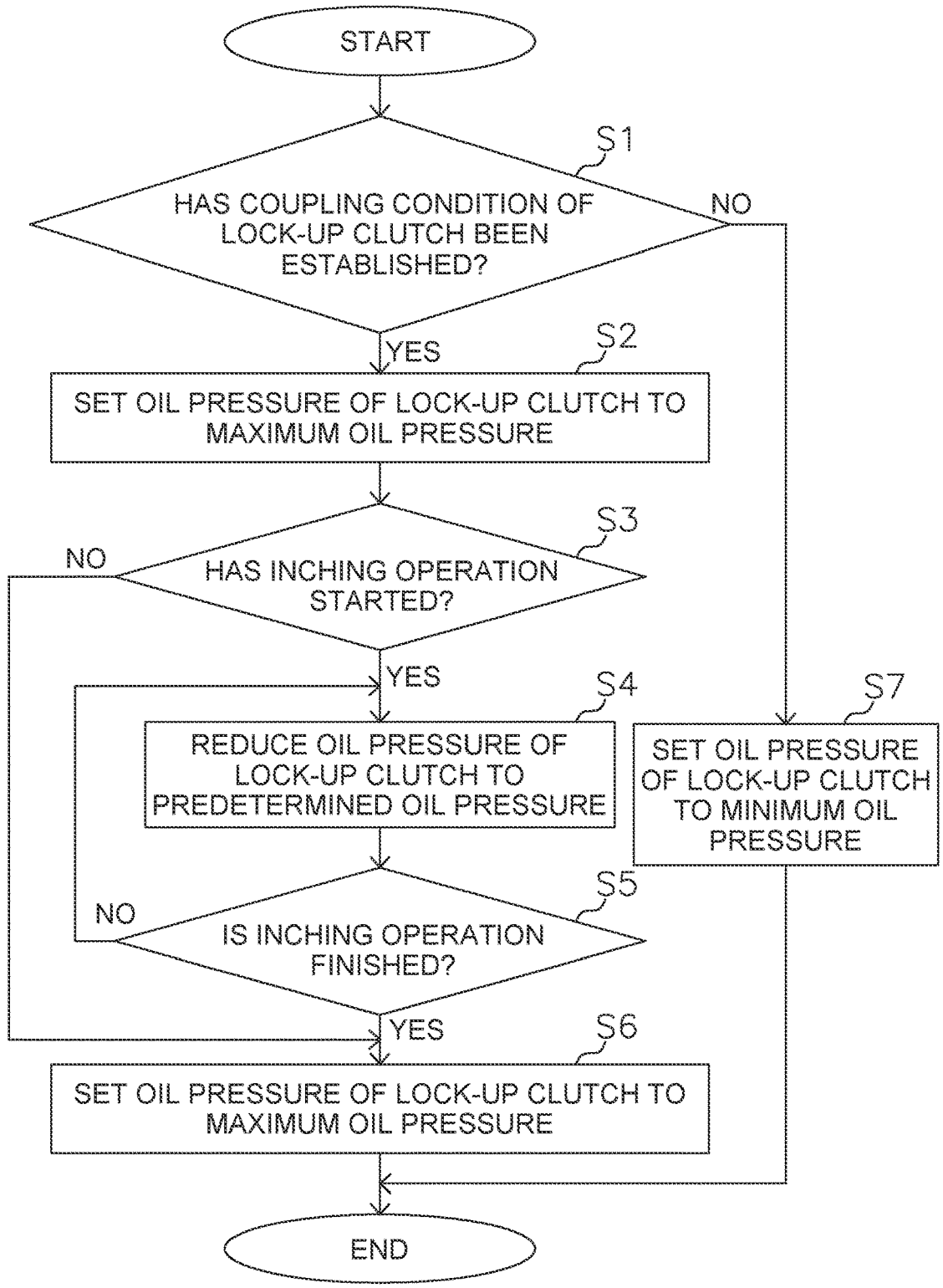
FIG. 4 is a flowchart for explaining an inching clutch protection control.

FIG. 4 is a flowchart for explaining an inching clutch protection control executed by the control unit 8.

In step S1, the control unit 8 determines whether a condition for switching the lock-up clutch 70 to the engaged state is established. When it is has been determined that the condition for switching to the engaged state is established, the control unit 8 controls the oil pressure of the lock-up clutch 70 to the maximum oil pressure in step S2, and then the processing advances to step S3. On the other hand, when it is has been determined that the condition for switching to the engaged state has not been established, the control unit 8 controls the oil pressure of the lock-up clutch 70 to the minimum oil pressure in step S7, and then the processing is finished.

In step S3, the control unit 8 determines whether the inching operation has started. When it is determined that the inching operation has started, the control unit 8 controls the oil pressure of the lock-up clutch 70 to a predetermined oil pressure which is smaller than the maximum oil pressure in step S4, and then the processing advances to step S5. On the other hand, when it is determined that the inching operation has not started, the control unit 8 maintains the oil pressure of the lock-up clutch 70 at the maximum oil pressure in step S6, and then the processing is finished.

In step S5, the control unit 8 determines whether the inching operation is finished. When it is determined that the inching operation is finished, the control unit 8 returns the oil pressure of the lock-up clutch 70 to the maximum oil pressure in step S6, and then the processing is finished. On the other hand, when it is determined that the inching operation is not finished, the control unit 8 repeats the processing in step S4.

(Characteristics)

The control unit 8 controls the oil pressure supplied to the lock-up clutch 70 to a "predetermined pressure" when the inching clutch (the FL clutch 63, the FH clutch 64, or the R clutch 65) is partially engaged on the basis of the operation signals from the inching pedal 13. Therefore, as indicated above, the protection of the inching clutch and the suppression of a reduction in speed can both be achieved.

Figure 5:
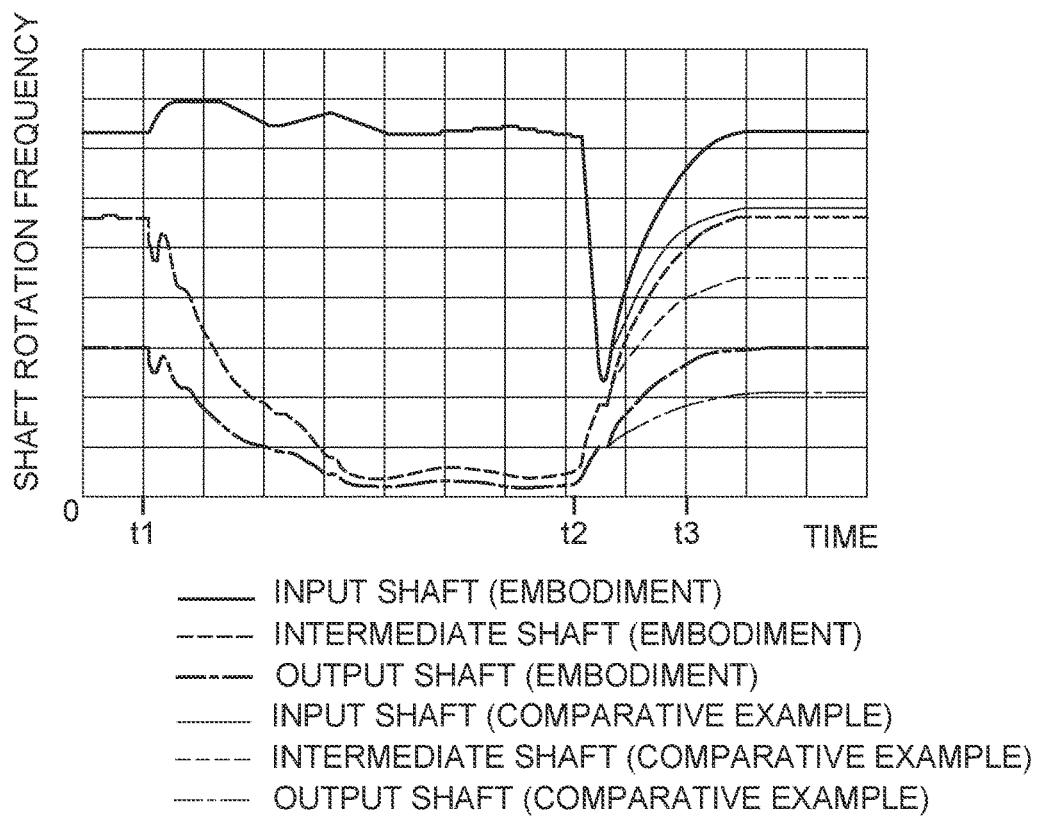
FIG. 5 is a graph illustrating temporal changes in the state of the vehicle.
Figure 6:
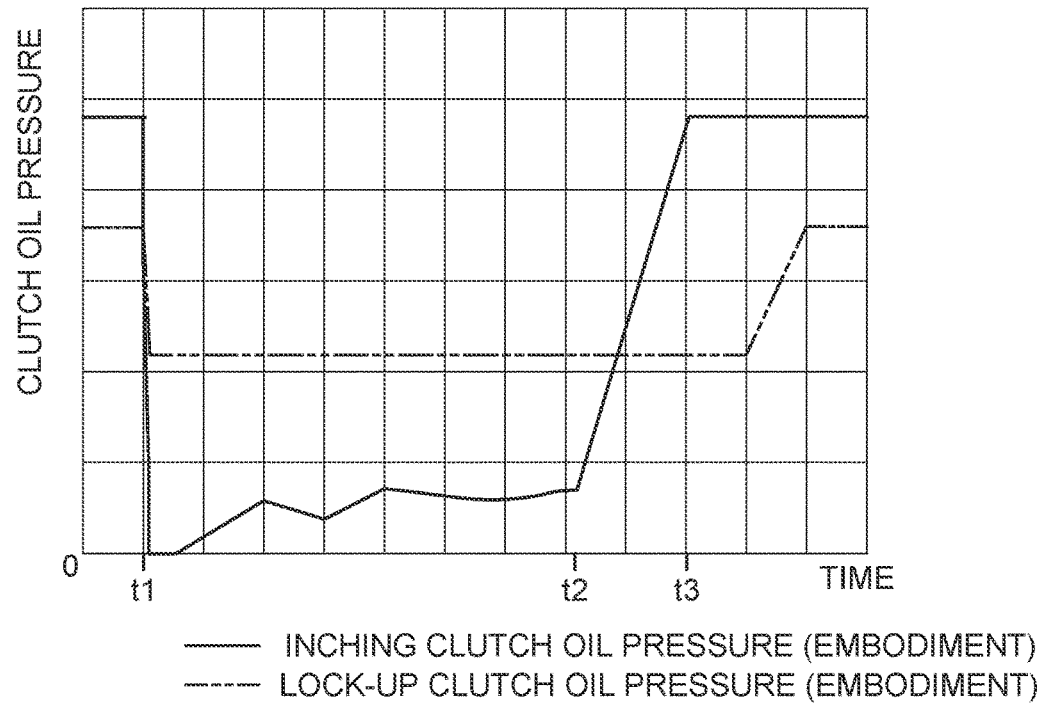
FIG. 6 is a graph illustrating temporal changes in the state of the vehicle.
Figure 7:
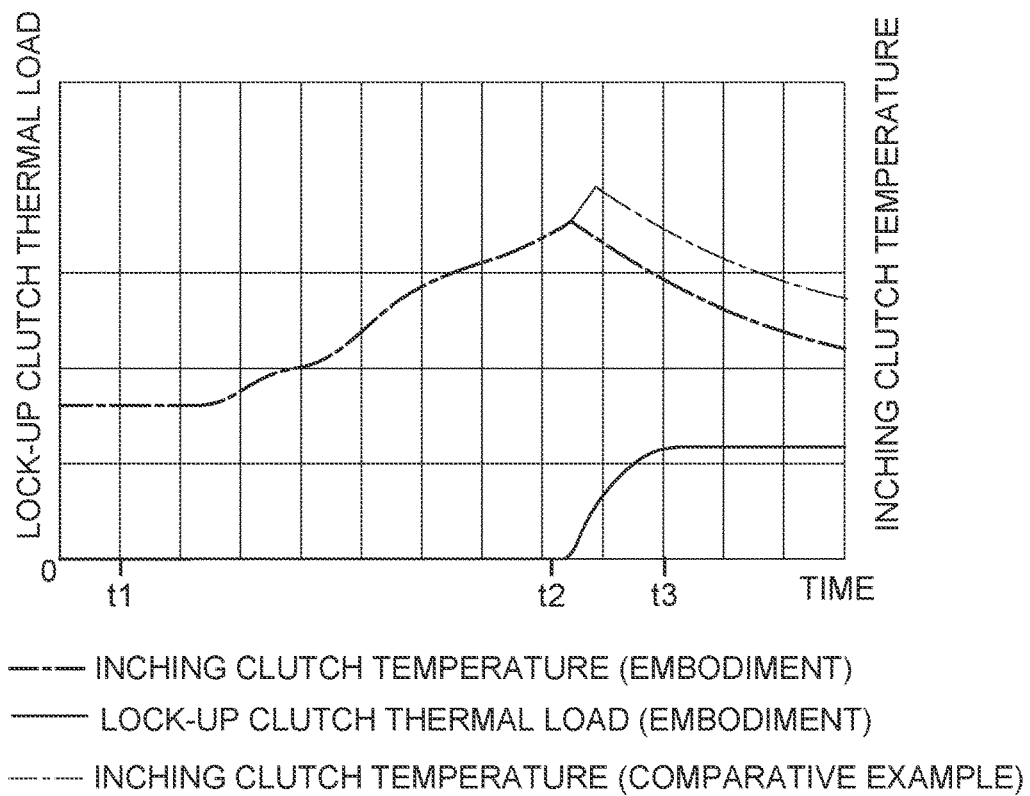
FIG. 7 is a graph illustrating temporal changes in the state of the vehicle.

The effects of the inching clutch protection control according to the present embodiment is confirmed with reference to the time sequence changes of the vehicle state illustrated in FIGS. 5 to 7.

FIG. 5 is a graph illustrating transitions of the rotation frequency of the input shaft that couples the torque converter 61 and the inching clutch, the rotation frequency of the intermediate shaft that couples the inching clutch and the speed clutches 66 to 69, and the output shaft that couples the speed clutches 66 to 69 and the travel mechanism 9. FIG. 6 is a graph that illustrates the transitions of the oil pressure of the hydraulic fluid supplied to the inching clutch and the oil pressure of the hydraulic fluid supplied to the lock-up clutch 70. FIG. 7 is a graph illustrating transitions of the temperature of the inching clutch and the thermal load of the lock-up clutch 70.

FIGS. 5 and 7 illustrate an embodiment corresponding to the inching clutch protection control according to the present embodiment and a comparative example corresponding to a control for switching the lock-up clutch to the disengaged state when the inching clutch temperature reaches a predetermined temperature.

FIGS. 5 to 7 begin from a scenario in which the vehicle is traveling while the lock-up clutch 70 is in the engaged state. As illustrated in FIG. 6, at the time point t1 from the start, the inching operation starts and the oil pressure supplied to the inching clutch falls, accordingly, the oil pressure supplied to the lock-up clutch 70 falls from the maximum oil pressure to the predetermined oil pressure, and the lock-up clutch 70 is switched from being fully engaged to being partially engaged. As illustrated in FIG. 6, the inching clutch is returned to being fully engaged from being partially engaged during the period from the start to time points t2 to t3. At this time, as illustrated in FIG. 7, the lock-up clutch 70 slips and a thermal load is generated. When the lock-up clutch 70 slips in this way, the torque converter mechanism 62 begins to function and a portion of the thermal load assumed only by the inching clutch can also be assumed by the torque converter 60. Therefore as illustrated in FIG. 7, the rise in the temperature of the inching clutch can be suppressed more in the embodiment than in the comparative example.

In addition, because the lock-up clutch 70 is partially engaged, the rotation frequency of the intermediate shaft and the rotation frequency of the output shaft can be raised more quickly in the embodiment than in the comparative example as illustrated in FIG. 5.

As indicated above, the protection of the inching clutch and the suppression in speed reduction can both be achieved according to the method of the present embodiment.

OTHER EMBODIMENTS

While the above embodiment describes the motor grader 1 as an example of the work vehicle to which the inching clutch protection control as in the present invention is applied, the inching clutch protection control as in the present invention can be widely applied to a work vehicle provided with drive wheels and a work implement (for example, a bulldozer, a forklift, etc.).

While the rear wheels 12 are used as the "drive wheels" in the above embodiment, wheels other than the rear wheels 12 (such as the front wheels 11) may be used as the "drive wheels."

While the FL clutch 63 or the FH clutch 64 which are both directional clutches is used as the "inching clutch" in the above embodiment, a speed clutch (any one of the first to fourth clutches 66 to 69) provided to the power transmission mechanism 6 may be used as the "inching clutch."

While the FL clutch 63 or the FH clutch 64 which are both directional clutches is used as the "inching clutch" in the above embodiment, a speed clutch (any one of the first to fourth clutches 66 to 69) provided to the power transmission mechanism 6 may be used as the "inching clutch."

While the FL clutch 63 or the FH clutch 64 which are directional clutches are used as the "inching clutch" in the above embodiment, the power transmission mechanism 6 may be provided with an inching dedicated clutch coupled to the lock-up clutch and separate from the directional clutches and the speed clutches. The inching dedicated clutch is provided only for the inching operation.

While the control unit 8 executes the inching clutch protection control when the lock-up clutch 70 is in the engaged state in the above embodiment, the present invention is not limited in this way. The control unit 8 may also execute the inching clutch protection control when the lock-up clutch 70 is not in the engaged state.

What is claimed is:

1. A work vehicle comprising:
   an engine;
   a drive wheel;
   a power transmission mechanism configured to transmit a driving power of the engine to the drive wheel; and
   a control unit configured to control the power transmission mechanism,
   the power transmission mechanism having
      a torque converter including a first clutch, and
      a second clutch coupled to the torque converter, and
   the control unit being configured to control an oil pressure supplied to the first clutch to a predetermined oil pressure when the second clutch is partially engaged.

2. The work vehicle according to claim 1, wherein
   the power transmission mechanism has a directional clutch and a speed clutch, and
   the second clutch is the directional clutch or the speed clutch.

3. The work vehicle according to claim 1, wherein
   the second clutch is an inching dedicated clutch coupled to the first clutch.

4. The work vehicle according to claim 1, further comprising:
   a frame supporting the engine; and
   a work implement supported by the frame.

5. The work vehicle according to claim 1, wherein
   the first clutch is immersed in a lubricating oil pooled in the torque converter.

6. The work vehicle according to claim 1, wherein
   the control unit is further configured to control the oil pressure supplied to the first clutch to the predetermined oil pressure when
      the first clutch is in a coupled state and
      the second clutch is partially engaged.

* * * * *